(12) United States Patent
Nahata et al.

(10) Patent No.: US 7,877,247 B2
(45) Date of Patent: Jan. 25, 2011

(54) SYSTEM AND METHOD FOR DYNAMICALLY SIMULATING DEVICES AT A COMPUTING DEVICE

(75) Inventors: Apul Nahata, San Diego, CA (US); Srinivas Patwari, San Diego, CA (US); Mahesh Moorthy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1491 days.

(21) Appl. No.: 10/990,006

(22) Filed: Nov. 15, 2004

(65) Prior Publication Data
US 2005/0125211 A1 Jun. 9, 2005

Related U.S. Application Data

(60) Provisional application No. 60/520,047, filed on Nov. 13, 2003.

(51) Int. Cl.
*G06F 17/50* (2006.01)
(52) U.S. Cl. ........................................................ 703/13
(58) Field of Classification Search .................... 703/13; 709/227; 370/351; 719/331; 455/502; 369/47.38
See application file for complete search history.

(56) References Cited

U.S. PATENT DOCUMENTS

| 2002/0012361 | A1 | 1/2002 | Houtepen et al. | |
| 2005/0037787 | A1* | 2/2005 | Bachner et al. | 455/502 |
| 2005/0128908 | A1* | 6/2005 | Shin et al. | 369/47.38 |

FOREIGN PATENT DOCUMENTS

| JP | 0354657 | 3/1991 |
| JP | 6266603 | 9/1994 |
| JP | 2000330821 | 11/2000 |
| JP | 2001306313 | 11/2001 |
| JP | 2003504977 | 2/2003 |
| KR | 20020010559 | 2/2002 |

(Continued)

OTHER PUBLICATIONS

Pramanik et al., S. Rabit: A New Framework for Runtime Emulation and Binary Translation, Proceedings of the 37th Annual Symposium on Simulation ANSS '04, Apr. 2004, pp. 1-8.*

(Continued)

*Primary Examiner*—Russell Frejd
(74) *Attorney, Agent, or Firm*—James T. Hagler

(57) ABSTRACT

A method is provided and includes generating a first simulated device at a device simulator. The first simulated device corresponding to a first physical device. Also, a second simulated device is generated at the device simulator. The second simulated device corresponds to a second physical device. At least one behavior extension file is loaded at the device simulator. Further, the behavior extension file is applied to the first simulated device or to the second simulated device. The method further includes selectively loading an application to the device simulator. The application can be selectively executed with respect to the first simulated device, the second simulated device, or to the first simulated device and the second simulated device. Also, the application can be modified at least partially in response to the execution of the application at the device simulator to produce a modified application.

70 Claims, 7 Drawing Sheets

FOREIGN PATENT DOCUMENTS

| | | |
|---|---|---|
| KR | 200374296 | 3/2003 |
| WO | WO03065168 | 8/2003 |

OTHER PUBLICATIONS

Ung et al., D. Machine-adaptable dynamic binary translation, Proceedings of the ACM SIGPLAN workshop on Dynamic and adaptive compilation and optimization, Jan. 2000, pp. 41-51.*

Gupta, P. Nokia Mobile Internet Toolkit 3.1 eases burden of writing MMS applications, Sep. 2002, pp. 1-5.*

PersonalJava(TM) Technology White Paper (c) 1998 Sun Microsystems, Inc. Aug. 1998. Printed from http://java.sun.com/products/personaljava/pf_white.pdf.

PersonalJava(TM) Application Environment Specification (c) Sun Microsystems, Inc. Version 1.1.1 (Final). Jan. 7, 1999. Printed from http://java.sun.com/products/personaljava/spec-1-1-1/pjae-spec.pdf.

Sony Ericsson "Developer News". vol. 2—Mar. 2003. Printed from http://www.sonyericsson.com/developerimages/devnews_march_2003.pdf. p. 1 teaches "Introduction to BREW(TM)", indicating market use before the priority date.

Chander, Arvin. "BREW(R) A Global Perspective." BREW Japan Conference 1996. Printed from http://www.brewjapan.com/seminar/report2006/BREW%20JAPAN_QC_Arvin.pdf. Teaches on p. 3 that "BREW commercially launced in 2001." Also teaches on p. 5 that "Since launching the BREW solution in Jul. 2003, . . . ".

Qualcomm CDMA Technologies "Launchpad". Mar. 2003. Printed from http://www.cdmatech.com/download_library/pdf/launchpad_brochure.pdf. Teaches the use of a "BREWapi" on p. 4.

Uievolution(TM). "UIEvolution(TM) Invents New Category of Wireless Internet Software." Mar. 20, 2001. Teaches creation of game software for Qualcomm's BREW.

Qualcomm, Inc. "Starting wiht BREW(TM): Binary Runtime Enviomment for Wireless." Apr. 27, 2004.

Wikipedia—"Mobile Development." Printed on Jun. 23, 2006 from http://en.wikipedia.org/wiki/Mobile_development.

Wikipedia—"PersonalJava." Printed on Jun. 23, 2006 from http://en.wikipedia.org/wiki/PersonalJava.

Wikipedia—"Java Platform, Micro Edition." Printed on Jun. 23, 2006 from http://en.wikipedia.org/wiki/J2ME.

Wikipedia—"SmartPhone." Printed on Jun. 23, 2006 from http://en.wikipedia.org/wiki/SmartPhone.

Wikipedia—"Binary Runtime Environment for Wireless." Printed on Jun. 23, 2006 from http://en.wikipedia.org/wiki/BREW.

International Search Report—PCT/US2004/038344, International Search Authority—ISA/US-Aug. 18, 2006.

Written Opinion—PCT/US2004/038344, International Search Authority—ISA/US-Aug. 18, 2006.

International Preliminary Report on Patentability—PCT/US2004/038344, International Search Authority—IPEA/US-Jun. 20, 2008.

* cited by examiner

SYSTEM AND METHOD FOR DYNAMICALLY SIMULATING DEVICES AT A COMPUTING DEVICE

CROSS-REFERENCE TO RELATED APPLICATIONS

This application claims the benefit of U.S. provisional application 60/520,047, filed Nov. 13, 2003 and incorporated herein by reference in its entirety.

REFERENCE TO COMPUTER PROGRAM LISTING APPENDIX

A portion of the present disclosure is contained in a computer program listing appendix electronically submitted via EFS-Web. The submission contains an MS-WINDOWS text file named "AppendixI.txt" created on Sep. 27, 2007, and having a file size of approximately 19 kilobytes. The contents of this file are incorporated by reference herein. Any references to "Appendix I" or the like in this specification refer to the file contained on the compact disc.

The contents of this file are subject to copyright protection. The copyright owner has no objection to the reproduction by anyone of the patent document or the appendix as it appears in the Patent and Trademark Office patent files or records, but does not waive any other copyright rights by virtue of this patent application.

Continuing the description of the method, at decision step 512, the device simulator detects whether a data set is selected via the device simulator. If a data set is selected, the method continues to block 514 and the device simulator loads the data set. In a particular embodiment, the data set can be a joint photographic experts group (JPEG) file, a graphics interchange format (GIF) file, a tagged image file format (TIFF) file, a Adobe Photoshop (PSD) file, a portable networks graphics (PNG) file, a windows metafile (WMF) file, or other type of picture file that can be viewed at the simulated device. Also, the data set can be a moving picture experts group (MPEG) file, an audio video interleave (AVI) file, a Windows media video (WMV) file, an advanced streaming format (ASF) file, a Quicktime (MOV) file, a Real Media (RM) file, or other type of video file that can be viewed at the simulated device. The data set can be an MPEG audio layer three (MP3) file, a waveform audio format (WAV) file, a Windows Media Audio (WMA) file, an OGG file, a Monkey's Audio digital file (APE) file, a VOX file, a Real Audio (RA) file, a synthetic music mobile application format (MMF) file, or musical instrument digital interface (MID) file, a phrase format (SPF) file, a Qualcomm PureVoice audio file (QCP) or other sound file that can be listened to via the simulated device. The audio files can also be used as ring tones for cellular telephone devices. Further, the data set can be a font file that includes one or more fonts available on the computer or one or more fonts that are specific to simulated devices. Moving to block 514, the data set is applied to the simulated device. From block 516, the method moves to decision step 518. Returning to decision step 512, if a data set is not selected via the device simulator, the method proceeds to decision step 518.

BACKGROUND

I. Field

The present invention generally relates to device simulators. More particularly, the invention relates to computer applications for simulating devices.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, for example, further include cellular telephones that communicate voice and data packets over wireless networks. Further, many such wireless telephones provide significant computing capabilities, and as such, are becoming tantamount to small personal computers and hand-held PDAs.

Typically, these smaller and more powerful personal computing devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such personal computing devices (client computing devices).

Some of these personal computing devices utilize application programming interfaces (APIs) that are sometimes referred to as runtime environments and software platforms. The APIs can be installed onto a local computer platform and can be used to simplify the operation and programming of such devices by providing generalized calls for device specific resources. Further, some APIs can provide software developers the ability to create software applications that are fully executable on such devices. In addition, APIs can provide an interface between a personal computing device system hardware and the software applications. As such, the personal computing device functionality can be made available to the software applications without requiring the software developer to access the source code of the specific personal computing device. Further, some APIs can provide mechanisms for secure communications between personal devices, such as client devices and server systems, using secure cryptographic key information.

Examples of such APIs, some of which are discussed in more detail below, include those currently publicly available versions of the Binary Runtime Environment for Wireless® (BREW®), developed by Qualcomm, Inc. of San Diego, Calif. BREW® can be described as a thin veneer that exists over the operating system of a computing device, such as a wireless cellular phone. BREW® can provide one or more interfaces to hardware features particularly found on personal computing devices.

Further, BREW® is advantageous in that it can be provided on personal computing devices at a relatively low cost with respect to the demands on device resources and with respect to the prices typically paid by consumers for devices containing the BREW® API. Additionally, BREW® provides an end-to-end software distribution platform that includes a variety of benefits for wireless service operators, software developers and computing device consumers. One such currently available end-to-end software distribution platform includes logic distributed over a server-client architecture, wherein the server can perform billing, security, and application distribution functionality, and wherein the client can perform application execution, security and user interface functionality.

In order to develop software for various types of portable personal computing devices, it is sometimes necessary to physically possess and test the particular physical device for which the software is being developed. The possession of the physical device can allow a developer to execute the software loaded onto the physical device in order to debug the software and determine if the developed software provides the functionality intended by the developer. Alternatively, the software developer can use a device simulator, but such device simulators are typically static and tied to a single type and model of a physical device.

Accordingly it would be advantageous to provide an improved device simulator that can simulate multiple devices exhibiting multiple behaviors.

SUMMARY

A method is provided and includes generating a first simulated device at a device simulator. The first simulated device corresponds to a first physical device. Also, a second simulated device is generated at the device simulator. The second simulated device corresponds to a second physical device. At least one behavior extension file is loaded at the device simulator. Further, the behavior extension file is applied to the first simulated device or to the second simulated device.

In a particular embodiment, the behavior extension file is applied to the first simulated device and to the second simulated device. Additionally, in a particular embodiment, the first physical device is selected from the group consisting of a cellular telephone, a portable digital assistant, and a pager. Also, the second physical device is selected from the group consisting of a cellular telephone, a portable digital assistant, and a pager. In a particular embodiment, a first device pack is executed and includes the behavior extension file that represents selected behaviors of the first simulated device. Moreover, a second device pack is executed and includes a second behavior extension file that represents selected behaviors of the second simulated device.

In another particular embodiment, the method further includes selectively loading a data set to the device simulator. The data set can be an audio file, a video file, an image file, or a font file. Additionally, the data set can be selectively applied to the first simulated device, the second simulated device, or to the first simulated device and the second simulated device. Also, in a particular embodiment, the method includes selectively loading an application to the device simulator. The application can be selectively executed with respect to the first simulated device, the second simulated device, or to the first simulated device and the second simulated device. Also, the application can be modified at least partially in response to the execution of the application at the device simulator to produce a modified application. The modified application can be selectively executed on the first simulated device, the second simulated device, or the first simulated device and the second simulated device.

In another embodiment, a computer program is embedded within a computer readable medium and includes instructions to generate a base simulator and instructions to generate a first simulated device for use with the base simulator. The computer program also includes instructions to load a first of a plurality of behaviors onto the first simulated device. Further, the computer program includes instructions to generate a second simulated device within the base simulator. Particularly, the second simulated device is different from the first simulated device. The computer program also includes instructions to load a second of the plurality of behaviors onto the second device.

In another embodiment, a base simulator is provided and simulates a baseline set of behaviors of a physical portable computing device. A plurality of behavior extensions is accessible to the base simulator. Further, the behavior extensions are applicable to the base simulator to simulate additional behaviors, other than the baseline set of behaviors, of the physical portable computing device.

In yet another embodiment, a software development system is provided and includes a processor and a memory device that is accessible to the processor. Further, a device simulator is embedded within the memory device. The device simulator includes instructions to simulate a first portable computing device and instructions to simulate a second portable computing device. Additionally, the device simulator includes instructions to apply at least one behavior extension to the first portable computing device, the second portable computing device, or to the first portable computing device and to the second portable computing device.

In still another embodiment, a user interface is provided and includes a first simulated device that has a first behavior and a second a second simulated device that has a second behavior. One or more programs can be executed at the first simulated device, the second simulated device, or at both the first simulated device and the second simulated device. Also, the first simulated device is a simulation of a unique model of a cellular telephone, a portable digital assistant, or a pager.

In yet still another embodiment, a portable computing device includes a processor and a memory accessible that is to the processor. An application is loaded into the memory. The application is a tested application and the tested application is executed on a device simulator that has a set of device behaviors common to a plurality of different types of physical computing devices. Also, the device simulator has a plurality of extension files that define extension features for use by the device simulator to simulate a plurality of additional behaviors for at least one of the plurality of different types of physical computing devices.

In another embodiment, a method for testing an application is provided and includes receiving an application. The application is tested at a device simulator to generate a debugged application. Particularly, the device simulator includes a core simulation program that can be used to simulate a baseline set of behaviors of at least one physical portable computing device. Further, the device simulator includes extension files that define extension features to be applied to the simulation program to simulate additional behaviors of the at least one physical portable computing device. The debugged application can be communicated to a server.

In yet another embodiment, a method includes receiving an application at a server. Particularly, the application is tested on a device simulator that includes a plurality of behaviors common to a plurality of different types of physical computing devices. Also, the device simulator includes a plurality of extension files that define extension features for use by the device simulator to simulate a plurality of additional behaviors of the at least one of the physical computing devices. The application can be communicated from the server to a physical device corresponding to the simulated device.

In yet still another embodiment, a system is provided and includes a processor and a computer memory that is accessible to the processor. A simulation program is stored within the computer memory and is executable by the processor. The simulation program includes a core simulation program to simulate a set of behaviors common to a plurality of different types of physical portable computing devices that may be simulated. Moreover, the simulation program includes extension files that define extension features for use by the simulation program to simulate device behaviors in addition to the set of behaviors. Particularly, the device behaviors correspond to additional features of a physical device selected from the plurality of different types of physical portable computing devices. The system also includes an application program that is targeted for execution on at least one of the plurality of different types of physical portable computing devices. Further, the application program is tested using the simulation program.

In still yet another embodiment, a system is provided and includes a processor and a computer memory that is accessible by the processor. A simulation program is stored within the computer memory and is executable by the processor. The simulation program includes means for simulating a baseline set of behaviors of at least one physical portable computing device. Also, the simulation program includes means for defining extension features to be applied to the simulation program to simulate additional behaviors of the at least one physical portable computing device.

In another embodiment, a device simulator is provided and includes a BREW core for providing a base simulator. A shared extensions module coupled to the BREW core. Further, at least one built-in extension is implicit to the shared extensions module. The at least one built-in extension is accessible to the BREW core and provides a first behavior for a physical device simulated by the base simulator. Also, at least one generic extension is explicit to the shared extensions module. The at least one generic extension is accessible to the BREW core and provides a second behavior for the physical device simulated by the base simulator. Additionally, the device simulator includes at least one device pack that is accessible to the BREW core. The at least one device pack includes at least one device pack extension that is accessible to the BREW core and provides a third behavior for the physical device simulated by the base simulator.

Other aspects, advantages, and features of the present invention will become apparent after review of the entire application, including the following sections: Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. The word "simulator" is used to describe a computer application that can simulate an actual physical device or a device run time environment. As used herein, the word "simulator" is intended to include emulators. Further, many embodiments are described in terms of sequences of actions to be performed by, for example, elements of a computing device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action.

The following detailed description describes methods, systems, software and apparatus used to simulate one or more devices at a computing device. In at least one embodiment a device simulator can simulate a portable device at a computing system. Application programs developed for the actual physical portable device that corresponds to a simulated device can be executed at the computing system. In particular, the application programs can be tested using simulated devices generated at the computer device.

In one or more embodiments, a device simulator can simulate one or more personal computing devices and can operate in conjunction with a runtime environment. One such runtime environment is a version of the Binary Runtime Environment for Wireless® (BREW®) software platform developed by QUALCOMM, Inc., of San Diego, Calif. In at least one embodiment in the following description, the system used to provide communications between client computing devices and servers is implemented on a computing device executing a runtime environment, such as the current version of the BREW® software platform. However, one or more embodiments of the system used to provide communications between client computing devices and servers are suitable for use with other types of runtime environments that, for example, operate to control the execution of applications on wireless client computing devices.

Figure 1:
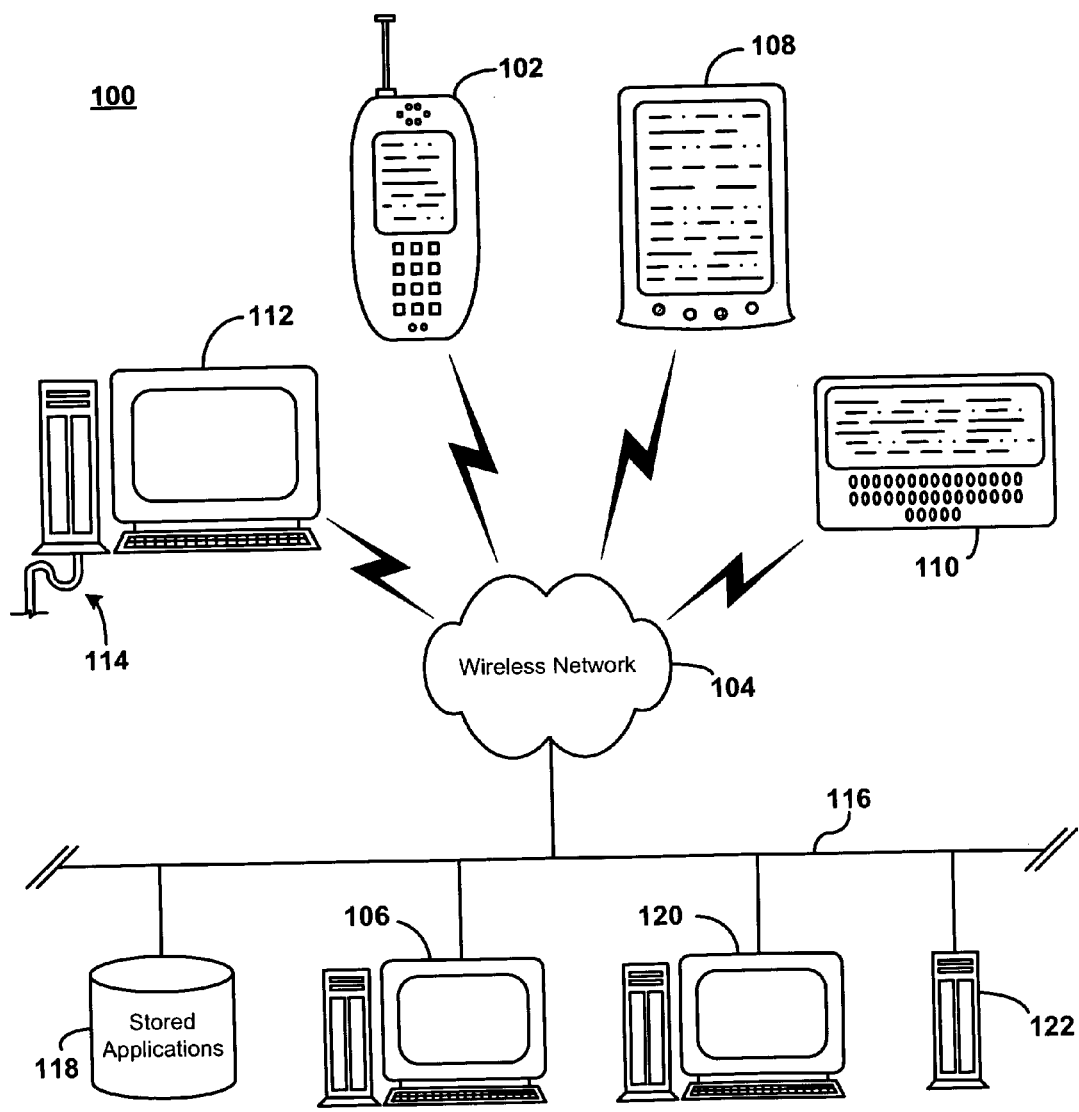
FIG. 1 is a general diagram of a particular embodiment of a system providing communications between a client computing device and a server.

FIG. 1 illustrates a block diagram of an exemplary, non-limiting embodiment of a system 100 for the loading, reloading, and deletion of software application components on a wireless device, such as cellular telephone 102. The cellular telephone 102 communicates across a wireless network 104 with at least one application server 106. Further, the application server 106 can selectively transmit one or more software applications and components to one or more wireless devices across a wireless communication portal or other data access to the wireless network 104.

As illustrated in FIG. 1, the wireless device can be a cellular telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones without a display or keypad, or any combination or sub-combination thereof.

As depicted in FIG. 1, the application download server 106 is coupled to a network 116 with other computer elements in communication with the wireless network 104. The system 100 includes is a second server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that are downloadable by the wireless devices 102, 108, 110, 112. Different embodiments are contemplated that locate logic to perform secure communications at any one or more of the application download server 106, the second server 120 and the stand-alone server 122.

Figure 2:
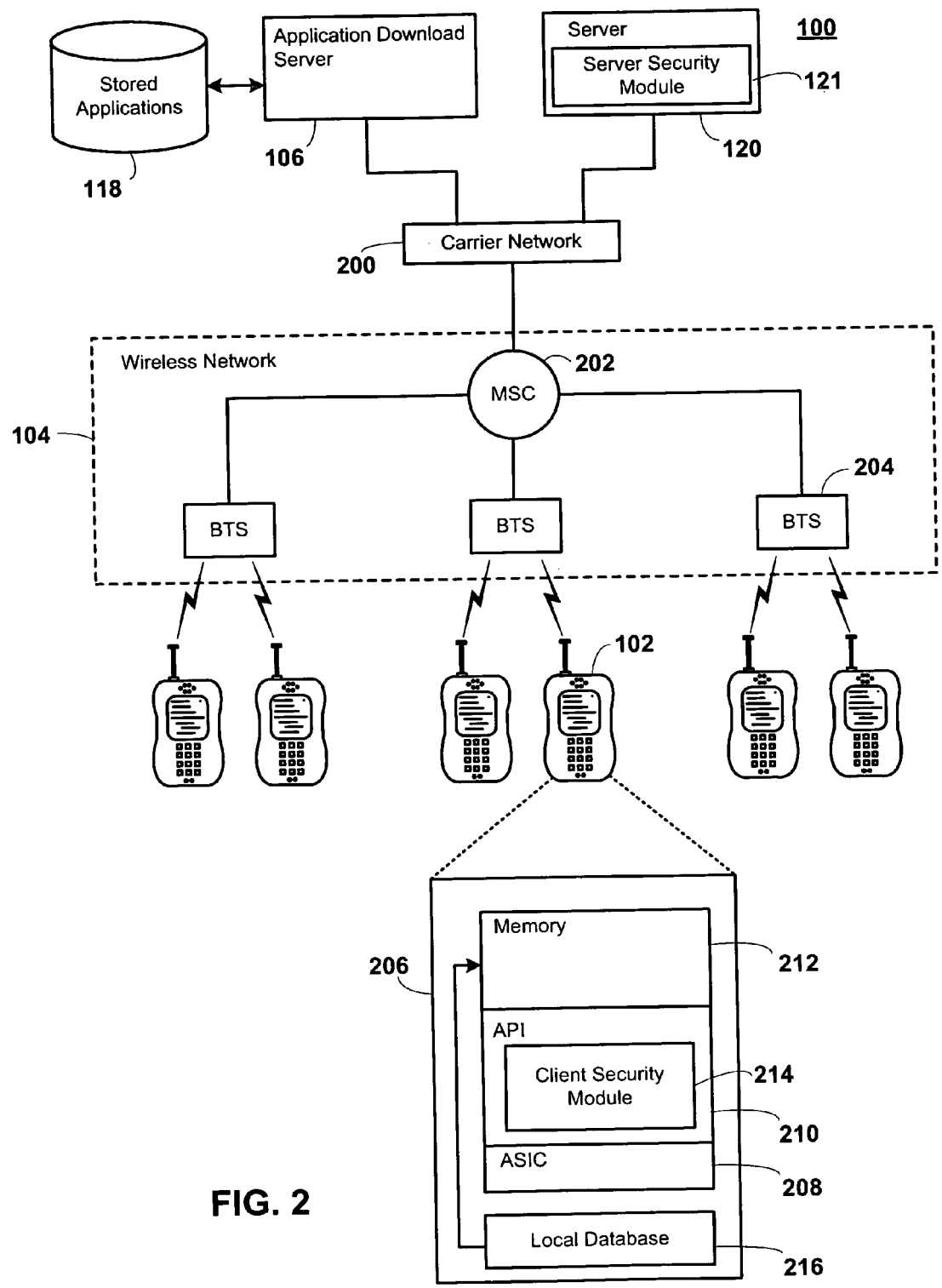
FIG. 2 is a general diagram that illustrates further details of the particular embodiment of the system for communications between a client computing device and a server of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless client computing devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, that can provide cellular telecommunication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a client computing device, such as wireless devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS transfers voice information. The MSC 202 is connected to multiple base transceiver stations ("BTS") 204. The MSC 202 can be connected to the BTS 204 by both the network and/or Internet for data transfer and POTS for voice information. The BTS 204 ultimately broadcasts messages wirelessly to the wireless devices, such as to cellular telephone 102, by the short messaging service ("SMS"), or other over-the-air methods known in the art.

The wireless device, e.g., a wireless client computing device, such as cellular telephone 102, has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture of the wireless device. The ASIC 208 or other processor can execute an application programming interface ("API") 210 layer that interfaces with resident programs in the memory 212 of the wireless device. The memory 212 can be comprised of read-only or random-access memory (RAM or ROM), EEPROM, flash memory, or any other memory suitable to computer platforms. The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is a flash memory cell, but can be any secondary storage device as known in the art, such as magnetic media, EEPROM, optical media, tape, or floppy or hard disk.

A wireless client computing device, for example, the cellular telephone 102, can download one or more software applications, such as games, news, stock monitors, and the like, from the application download server 106. Further, the wireless computing device can store the application in the local database 216, when not in use, and can upload stored resident applications from the local database 216 to memory 212 for execution by the API 210 when desired by the user. Further, communications over the wireless network 104 are performed in a secure manner, at least in part, by the interaction and operation between the client security module 214 and the server security module 121.

Figure 3:
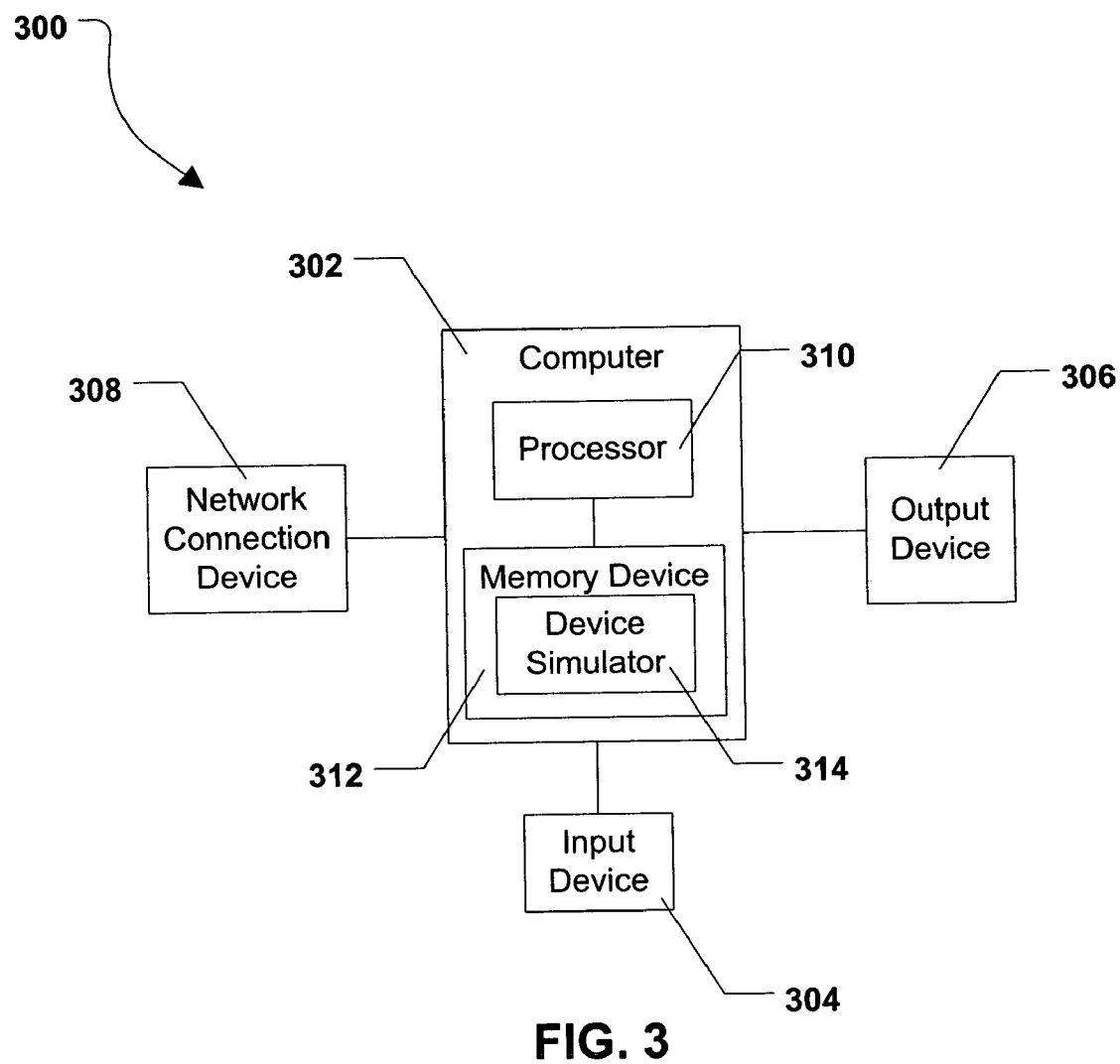
FIG. 3 is a block diagram of a computing system that supports portable device simulation.

Referring now to FIG. 3, a system for simulating personal computing devices is shown and is generally designated 300. As shown, the system 300 includes a computing system 302. In an illustrative embodiment, the computing system 302 can be a desktop computing device, a laptop computing device, or a handheld computing device. An input device 304 is coupled to the computing system 302. In an illustrative embodiment, the input device 304 can be used to input data or information. In a particular embodiment, the input device 304 is a keyboard. In other exemplary, non-limiting embodiments, the input device 304 can be a mouse, a light pen, a scanner, a touch screen, a cellular telephone, a digital camera, or an MP3 player.

FIG. 3 further illustrates an output device 306 coupled to the computing system 302. The output device 306 can receive one or more outputs from the computing system 302 via a wire connection, a cable connection, or a wireless connection. In an illustrative embodiment, the output device 306 is a display device. In other exemplary, non-limiting embodiments, the output device 306 can be a printer, a recording device, a plotter, or a projector. FIG. 3 also shows a network connection device 308 that is also coupled to the computing system 302. The network connection device 308 can provide connectivity to a network, for example, a local area network (LAN), a wide area network (WAN), an intranet, or the Internet. In an illustrative embodiment, the network connection device 308 can be a modem or a router.

As shown in FIG. 3, the computing system 302 includes a processor 310 and a memory 312. The memory device 312 is coupled to the processor 310 and is accessible to the processor 310. In an illustrative embodiment, the memory device 312 can be a non-volatile memory device 312, such as a hard disk drive. The memory device 312 can be a read-only memory (ROM) device or random access memory (RAM) device. As further illustrated in FIG. 3, a device simulator 314 is loaded and is embedded within the memory device 312. In a particular embodiment, the device simulator 314 can simulate one or more personal computing devices at the computing system 302.

In a particular embodiment, an application program can be executed on the device simulator 314 within the computing system to simulate operation of a physical personal computing device. The application can be input to the computing system 302 and executed so that it appears to be executed on a simulated device that corresponds to the a selected physical personal computing device for which the computer application is intended. As such, a software developer can test a particular application program without having to port the application program to the particular physical personal computing device for which the program is intended. In an illustrative embodiment, the device simulator 314 can simulate different makes and models of cellular telephones. Also, the device simulator 314 can simulate different makes and models of portable digital assistants (PDAs), different makes and models of pagers, and different makes and models of other devices for which a computer application can be written. Further, the device simulator 314 can assign a core set of behaviors and an optional variety of additional behaviors to the simulated devices. For example, the device simulator 314 can use extension files to assign an audio player behavior, a video player behavior, an image viewer behavior, a digital video camera behavior, a digital still camera behavior, and a digital audio recorder behavior.

After applications are tested at the device simulator, the tested applications can be uploaded to a repository, e.g., the stored application database 118 show in FIG. 1. Further, the tested applications, which may have been modified based on the testing, can be downloaded to one or more wireless devices 102, 108, 110, 112 (FIG. 1). A service provider can charge a fee for each downloaded application and pass a portion of that fee to the software developer.

Figure 4:
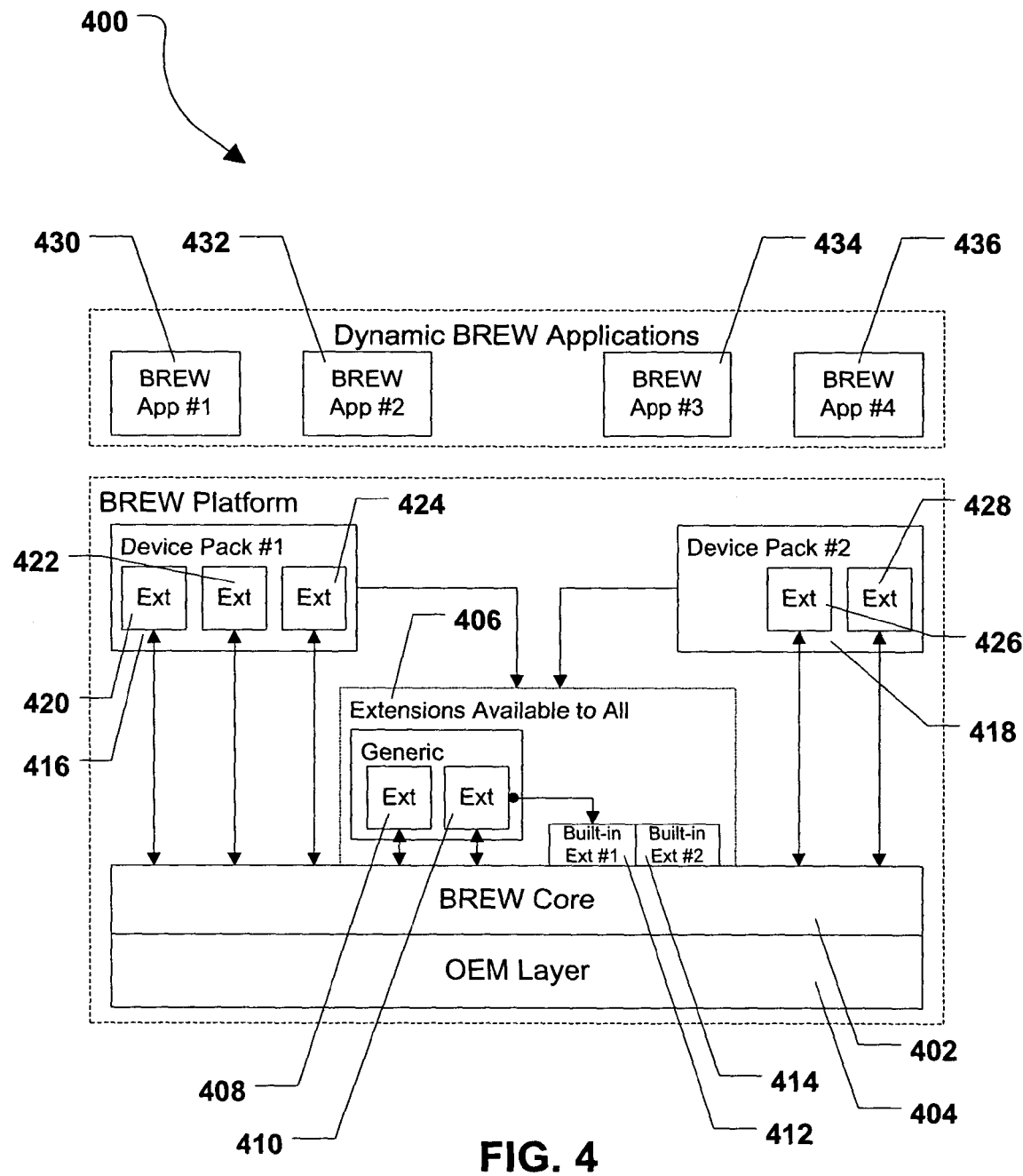
FIG. 4 is a block diagram that illustrates functions of a device simulator.

Referring to FIG. 4, an exemplary, non-limiting embodiment of a device simulator is shown and is generally designated 400. In an illustrative embodiment, the device simulator 400 can operate with the binary run-time environment for wireless (BREW) platform. However, the device simulator can operate on any other platform or operating system. As shown, the device simulator includes a BREW core 402. Further, the device simulator 400 includes an original equipment manufacturer (OEM) layer 404. The BREW core 402 includes multiple core BREW libraries and modules that can be used as an API to OEM layer 404. In a particular embodiment, the OEM layer 404 includes device specific code that can port BREW onto a computer in which the device simulator 400 is installed and executed.

FIG. 4 also shows that the device simulator 400 further includes a shared extensions module 406 that is coupled to the BREW core 402. As shown, the shared extensions module 406 includes extensions that can be made available to applications during operation of the device simulator 400. In a particular embodiment, the shared extensions module 406 includes a first generic extension 408 and a second generic extension 410. Further, the shared extensions module 406 includes a first built-in extension 412 and a second built-in extension 414.

In a particular embodiment, the generic extensions 408, 410 and the built-in extensions 412, 414 include features that are typically common to the devices that can be simulated by the device simulator. These features, for example, can include generic button sizes and shapes, generic display sizes and shapes, generic speaker sizes shapes, generic microphone sizes and shapes, generic antenna sizes and shapes.

As illustrated in FIG. 4, the device simulator 400 includes a first device pack 416 and a second device pack 418. Each device pack 416, 418 represents a particular physical device that can be simulated by the device simulator 400. Further, each device pack 416, 418 includes device model information relevant to the device that is represented by the device pack 416, 418. For example, each device pack 416, 418 can include networking and socket information for a particular device. Also, each device pack 416, 418 can include memory information such as the type of memory included in the device and the size of the memory. Further, the device packs 416, 418 can include display information including the type of display, e.g., liquid crystal display (LCD), the size of the display, and the resolution of the display.

Additionally, the device packs 416, 418 can include primary keypad information, secondary keypad information, keyboard information, primary display information, secondary display information, audio information, font information, supported media formats, application support, Bluetooth information, joystick information, touch screen information, global positioning system information, network information, predictive text entry information, memory information, subscriber information module information, and other device specific information, such as ring tones, call history information, address book information, and screen saver information. Appendix I shows an exemplary, non-limiting embodiment of a program written to create a device pack. In particular, the program shown in Appendix I can cause the device simulator 400 to display a simulation of a cellular telephone. FIG. 4 shows that the first device pack 416 includes a first extension 420, a second extension 422, and a third extension 424. FIG. 4 also shows that the second device pack 418 includes a first extension 426 and a second extension 428.

In a particular embodiment, the extensions included in each device pack 416, 418 are specific to the simulated device associated with the device pack 416, 418. Also, the extensions represent certain features or characteristics of a physical device that correspond to a simulated device. For example, these features can include, but are not limited to, audio player features, e.g., MP3 file playing, video player features, image viewer features, video camera features, still camera features, and audio recorder features. In a particular embodiment, if the device pack 416, 418 includes any behavior extensions that conflict with the generic extensions, the device pack extensions will override the generic extension behavior. When either device pack 416, 418 is loaded by a computer to the device simulator after being selected by a user, the extensions are available to any dynamic applications that are loaded to the device simulator for execution at the simulated device.

Additionally, FIG. 4 shows a plurality of dynamic BREW applications. Specifically, FIG. 4 shows a first dynamic BREW application 430, a second dynamic BREW application 432, a third dynamic BREW application 434, and a fourth dynamic BREW application 436. The dynamic applications 430, 432, 434, 436 can include programs that are being developed for use on a physical portable computing device. For example, the dynamic applications can include games, business applications, ring tones, and other business or entertainment related applications. In a particular embodiment, the dynamic BREW applications 430, 432, 434, 436 can have direct access to the BREW core 402, any shared applications, and any device pack extensions that are loaded to the device simulator. In a particular embodiment, during operation, the dynamic BREW applications 430, 432, 434, 436 can be executed by the device simulator on a simulated device or environment. This can allow developers of the dynamic BREW applications 430, 432, 434, 436 to execute the BREW applications 430, 432, 434, 436 on a BREW platform during development, in order to test and debug the BREW applications 430, 432, 434, 436 and to determine whether the operation of the dynamic BREW applications 430, 432, 434, 436 is as intended by the developer.

In a particular embodiment, the device simulator includes a common location for loading all extensions and the loaded extensions are applicable across all device packs for a particular instance of the device simulator. Further, when a device pack is loaded in the device simulator, the extensions may be loaded as follows: First, the built-in extensions are loaded. The built-in extensions are implicit to the device simulator and cannot be changed by the user. Second, generic extensions that are available and applicable to the device packs are loaded. The generic extensions are explicit to the device simulator can be modified or provided by a user and uploaded to the device simulator. The generic extensions can override the previously loaded built-in extensions only if they implement the functionality for the same BREW interface or BREW class as the previously loaded extensions. Third, the device pack extensions that are specific to the device pack are loaded. The device pack extensions are also explicit to the device simulator and can be modified or provided by a user and uploaded to the device simulator. The device pack extensions can override the generic extension loaded second if they implement the functionality for the same BREW interface or BREW class as the generic extensions loaded second. The device pack extensions can also override the built-in extensions, loaded first, if they implement the functionality for the same BREW interface or BREW class as the extensions loaded first.

Accordingly, if a built-in extension for a display is loaded first and then, a generic extension for the display is loaded, the generic extension will override the built-in extension. Thereafter, if a device pack extension for a display is loaded, it will override the generic extension and the built-in extension. If the generic extension is for a keypad, it will not override the built-in extension for a display, but a device pack extension for a display will still override a built-in extension for a display. In the explanation above, a BREW interface is intended to mean a collection of functions offering a similar service and is uniquely identified by a 32-bit identifier. Further, a BREW class is intended to mean an implementation of functions in a BREW interface.

In a particular example, with reference to FIG. 4, the assumption is made that the first device pack extension 420 is an updated or modified implementation of the second generic extension 410 and the second generic extension 410, in turn, is an updated or modified implementation of the first built in extension. As such, when the first device pack 416 is loaded onto the device simulator 400, the functionality provided by the first device pack extension 420, the second device pack extension 422, the third device pack extension 424, the first generic extension 408, and the second built-in extension 414 are available to the BREW applications 430, 432, 434, 436. This is due to the fact that the first device pack extension 420 overrides the second generic extension 410, which, in turn, overrides the first built-in extension 412.

Figure 5:
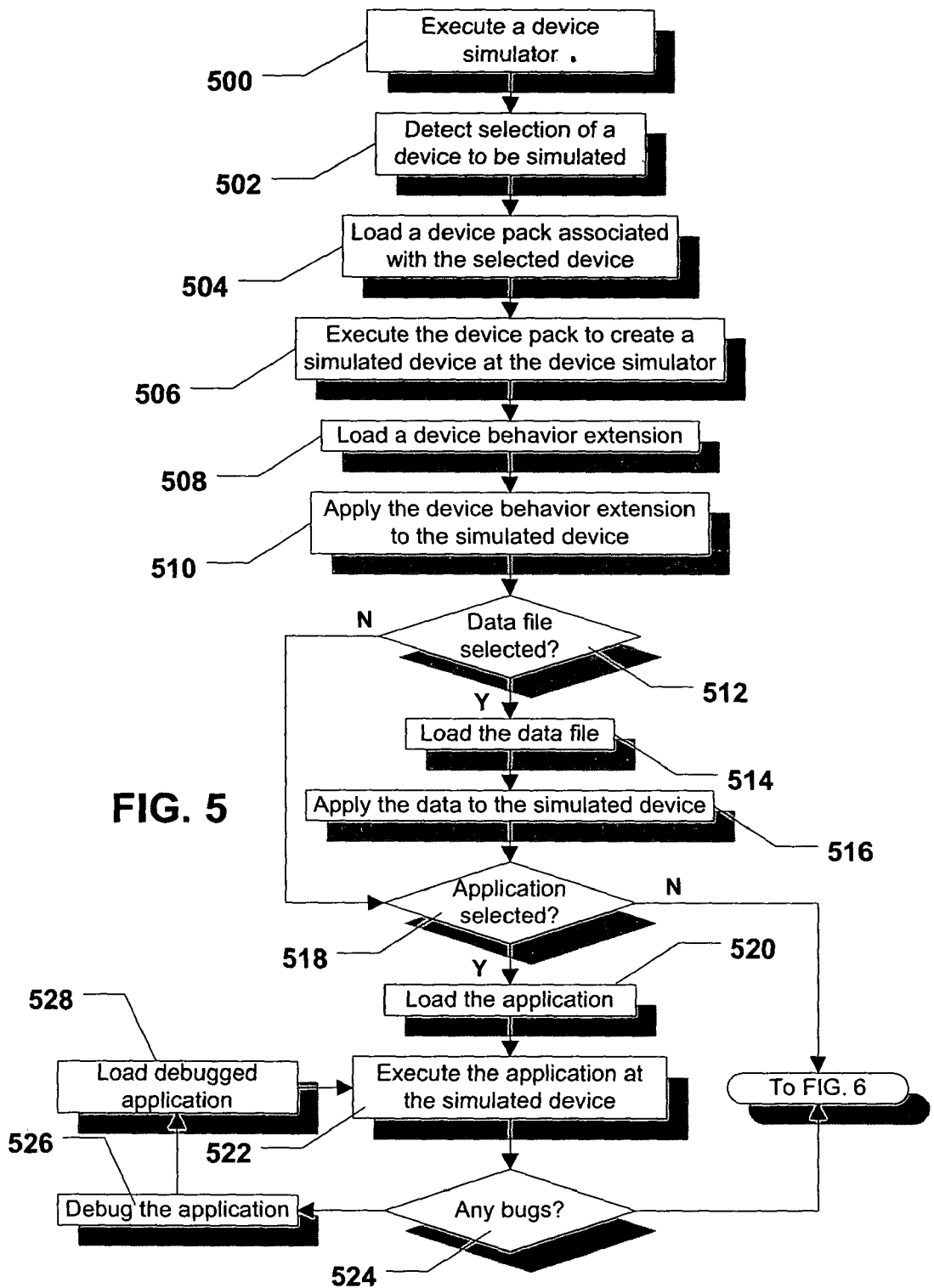
FIG. 5 is a flowchart illustrating a first portion of a method of simulating devices at a computing device.

Referring to FIG. 5, a method of simulating devices is shown and commences at block 500. At block 500, a computer executes a device simulator, e.g., the device simulator described herein. At block 502, the device simulator detects a selection of a particular physical device to be simulated. In a particular embodiment, a user can use a drop down menu to select from a list of physical devices that can be simulated or the user can use a drop down menu to select a particular device pack associated with a particular physical device. Moving to block 504, the computing device loads a device pack associated with the selected device. Then, at block 506, the device simulator executes the device pack to create a simulated device at the device simulator.

Proceeding to block 510, the device simulator loads one or more device behavior extensions associated with the device pack. The extensions can be loaded as described herein. Thereafter, at block 510, the device simulator can apply the device behavior extension to the simulated device presented by the device simulator. The device behavior extensions can define or modify the appearance of the simulated device. Further, the device behavior extensions can define or modify the functionality or the behavior of the simulated device. Then, the method proceeds to decision step 512.

Continuing the description of the method, at decision step 512, the device simulator detects whether a data set is selected via the device simulator. If a data set is selected, the method continues to block 514 and the device simulator loads the data set. In a particular embodiment, the data set can be a joint photographic experts group (JPEG) file, a graphics interchange format (GIF) file, a tagged image file format (TIFF) file, a Adobe Photoshop (PSD) file, a portable networks graphics (PNG) file, a windows metafile (WMF) file, or other type of picture file that can be viewed at the simulated device. Also, the data set can be a moving picture experts group (MPEG) file, an audio video interleave (AVI) file, a Windows media video (WMV) file, an advanced streaming format (ASF) file, a Quicktime (MOV) file, a Real Media (RM) file, or other type of video file that can be viewed at the simulated device. The data set can be an MPEG audio layer three (MP3) file, a waveform audio format (WAV) file, a wma file, an OGG file, a Monkey's Audio digital file (APE) file, a VOX file, a Real Audio (RA) file, a synthetic music mobile application format (MMF) file, or musical instrument digital interface (MID) file, a phrase format (SPF) file, a Qualcomm PureVoice audio file (QCP) or other sound file that can be listened to via the simulated device. The audio files can also be used as ring tones for cellular telephone devices. Further, the data set can be a font file that includes one or more fonts available on the computer or one or more fonts that are specific to simulated devices. Moving to block 514, the data set is applied to the simulated device. From block 516, the method moves to decision step 518. Returning to decision step 512, if a data set is not selected via the device simulator, the method proceeds to decision step 518.

At decision step 518, the device simulator detects whether an application written for a simulated device has been selected via the device simulator. If so, the application is loaded onto the device simulator at block 520. At block 522, the application is executed at the device simulator, e.g., at the simulated device. Particularly, the application can be executed at a simulated device environment that is provided by the device simulator and that corresponds to the operating environment of a particular physical device. Moving to decision step 524, the computer or the user determines whether the application has any problems or "bugs." If not the method then moves to decision step 600 of FIG. 6. If there are bugs, the logic moves to block 526 and the application is modified, i.e., debugged. Next, at block 528, the debugged application is loaded to the device simulator. The logic then returns to block 522 and continues as described herein. Returning to decision step 518, if an application is not selected via the device simulator the method also moves to decision step 600 of FIG. 6.

Figure 6:
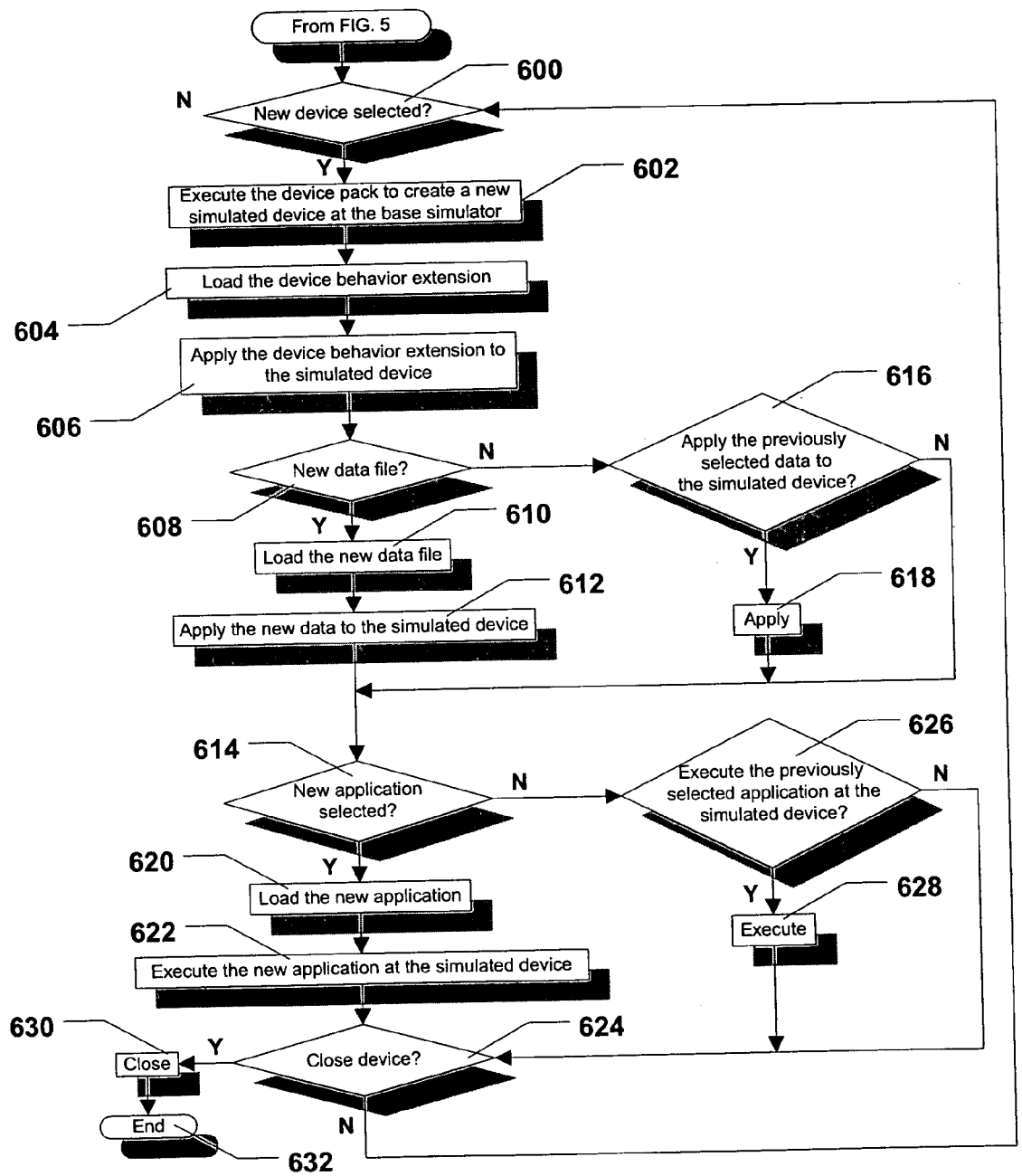
FIG. 6 is a flowchart illustrating a second portion of the method of simulating devices at a computing device.

Referring to FIG. 6, at block 600, the device simulator detects whether a new device is selected to be simulated at the device simulator. If a new device is selected, the device simulator executes a device pack associated with the newly selected device in order to create a new simulated device, at block 602. At block 604, a device behavior extension associated with the newly selected device is loaded at the device simulator. Thereafter, at block 606, the device simulator applies the new device behavior extension to the simulated device. The method then moves to decision step 608.

At decision step 608, the device simulator detects whether a new data set has been selected via the device simulator. If a new data set has been selected, the new data set is loaded to the device simulator, at block 610. Particularly, the new data set is loaded to the new simulated device at the device simulator and can be applied to, or processed by, the new simulated device, at block 612. Thereafter, the method proceeds to decision step 614. Returning to decision step 608, if a new data set is not selected, the logic moves to decision step 616 and the device simulator determines whether to apply the previously selected data to the new simulated device. In a particular embodiment, this determination can be made by presenting a question to a user. If the device simulator determines to apply the previously selected data to the new simulated device, the method proceeds to block 618 and the device simulator applies the previously selected data to the simulated device. The logic then proceeds to decision step 614.

At decision step 614, the device simulator determines whether a new application developed for the new simulated device is selected. If so, the new application is loaded onto the device simulator, at block 620. Particularly, the new application is loaded onto the simulated device at the device simulator. Next, at block 622, the new application is executed at the device simulator as described herein. Thereafter, the logic proceeds to decision step 624.

Returning to decision step 614, if a new application is not selected, the method continues to decision step 626 and the device simulator determines whether to execute the previously selected application at the simulated device. If so, the device simulator executes the previously selected and previously loaded device application at the simulated device. On the other hand, if the previously selected application is not to be executed, the logic continues to decision step 624 and the device simulator detects whether a user has decided to close the device simulator. If the user has decided to close the device simulator, the device simulator closes at block 630 and the method ends at step 632. If the device simulator is not closed at decision step 624, the logic returns to decision step 600 and continues as described above. In an illustrative embodiment, the method steps described herein are performed in the sequence shown. However, in one or more alternative embodiments, one or more of the method steps may be performed in a different sequence.

Figure 7:
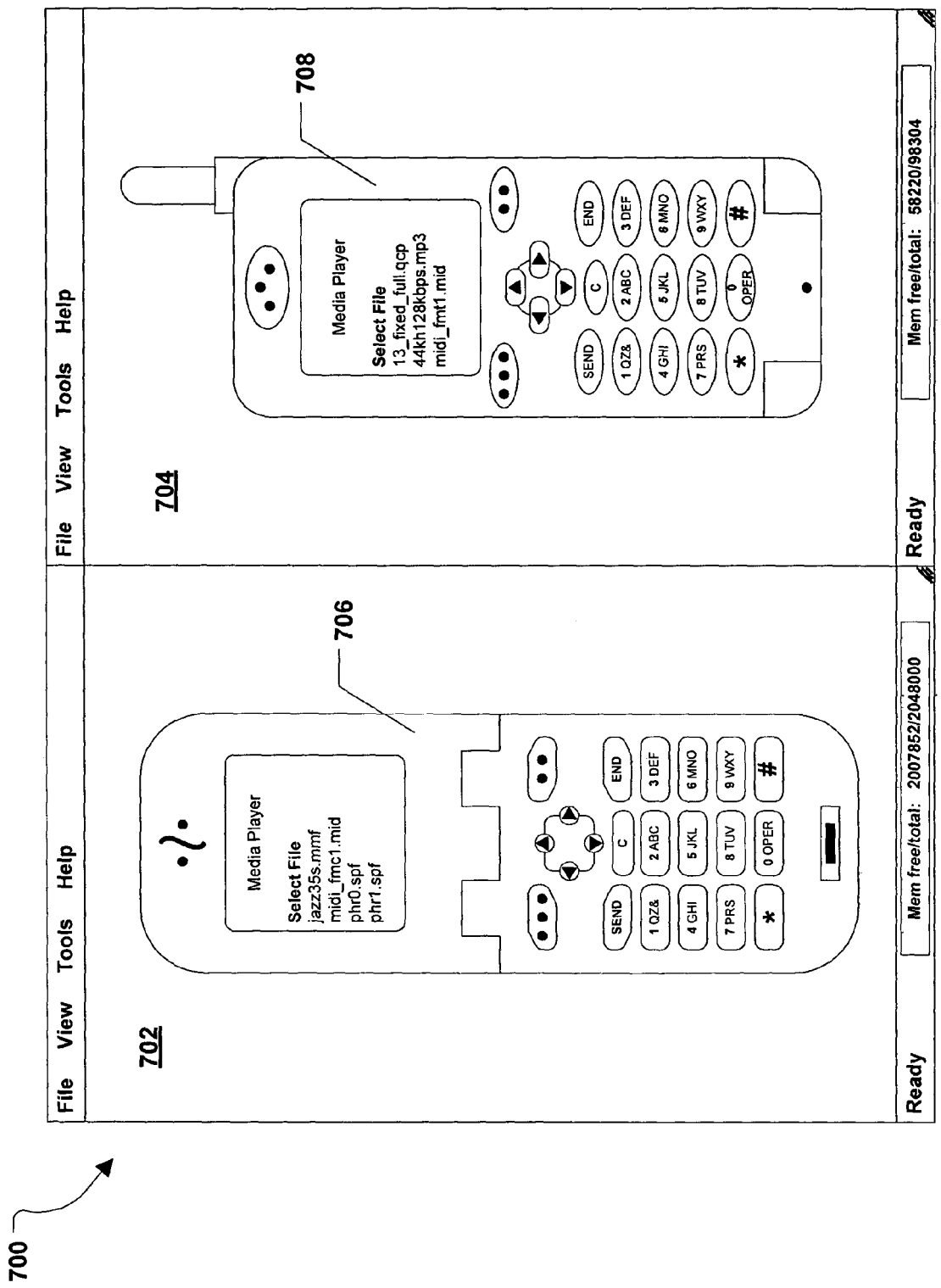
FIG. 7 is a diagram illustrating a graphical user interface associated with a device simulator.

FIG. 7 shows a graphical user interface, generally designated 700, that can be presented by the device simulator, described above. As shown the GUI 700 can include a first instance of a device simulator 702 and a second instance of a device simulator 704. The first instance of the device simulator 702 includes a first simulated device 706. Also, as shown in FIG. 7, the second instance of the device simulator 704 includes a second simulated device 708. In a particular embodiment, the first simulated device 706 is a simulation of a first model of a particular cellular telephone having particular functionality. Also, the second simulated device 708 is a simulation of a second model of a particular cellular telephone having different functionality. Further, in a particular embodiment, the base device simulator is the same in each instance of the device simulator 702, 704. In other words, the same background can be provided, the same drop down menus can be provided, and the same options can be provided.

A user can select a particular physical device via a drop down menu. The device simulator will generate a simulation of the physical device and present the simulation to the user as shown. The simulated devices 706, 708 will appear, behave, and function according to one or more behavior extensions loaded onto the device simulator 702, 704. Accordingly, if a camera behavior extension is loaded onto either of the simulated devices 706, 708 may operate as a camera phone. Further, if an audio player extension is loaded onto either of the simulated devices 706, 708 may operate as an MP3 player.

A user can select files, e.g., audio files, to load onto the simulated devices 706, 708. This can allow a user to test the operation of the simulated devices 706, 708. Further, a user can select one or more applications to be executed at the simulated devices 706, 708. Thus, a user can determine if one or more applications can be supported by particular physical devices. Further, a user can determine if one or more applications can function as intended by the user. In a particular embodiment, a particular application, or file, may utilize a first set of behavior extensions at the first simulated device 706 and a second set of behavior extensions at the second simulated device 708. As such, a particular program may exhibit a first behavior at a first simulated device 706 and a second behavior at a second simulated device 708.

In the example shown in FIG. 7, MID, MMF, and SPF files are enabled for the first simulated device 706. However, QCP and MP3 file formats are not included in the device pack for the first simulated device 706. As such, a Media Player list for the first simulated device 706 only lists mid, .mmf, and .spf files. On the other hand, the device pack associated with the second simulated device 708 does not contain the MID multimedia extension.

With the configuration of structure described above, the device simulator provides a very flexible tool that can be used during the development of applications for various portable computing devices. The device simulator allows device packs to dynamically provide functionality for the simulated devices provided by the device packs. Further, the functionality of the device simulator can be extended as new devices are developed by developing new device packs for the new devices. Also, the device simulator is modular and enables a simulation environment that provides operations that are very close to those of physical devices.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features as defined by the following claims.

What is claimed is:

1. A method, comprising:
generating a first simulated device at a device simulator, the first simulated device corresponding to a first physical device;
generating a second simulated device at the device simulator, the second simulated device corresponding to a second physical device;
loading at least one behavior extension file at the device simulator; and
executing the at least one behavior extension file in the first simulated device or in the second simulated device in order to determine a simulated behavior of the respective one of the first simulated device or the second simulated device.

2. The method of claim 1, wherein the at least one behavior extension file is executed in the first simulated device and the second simulated device.

3. The method of claim 1, wherein the first physical device is selected from the group consisting of a cellular telephone, a portable digital assistant, and a pager.

4. The method of claim 1, wherein the second physical device is selected from the group consisting of a cellular telephone, a portable digital assistant, and a pager.

5. The method of claim 1, further comprising executing a first device pack including the at least one behavior extension file representing selected behaviors of the first simulated device.

6. The method of claim 5, further comprising executing a second device pack including a second behavior extension file representing selected behaviors of the second simulated device.

7. The method of claim 6, further comprising selectively loading a data set to the device simulator.

8. The method of claim 7, wherein the data set is an audio file, a video file, an image file, or a font file.

9. The method of claim 8, further comprising selectively applying the data set to the first simulated device, the second simulated device, or to the first simulated device and the second simulated device.

10. The method of claim 5, further comprising selectively loading an application to the device simulator.

11. The method of claim 10, further comprising selectively executing the application with respect to the first simulated device, the second simulated device, or to the first simulated device and the second simulated device.

12. The method of claim 11, further comprising modifying the application at least partially in response to the execution of the application at the device simulator to produce a modified application.

13. The method of claim 12, wherein the application utilizes at least a first behavior extension during execution with respect to the first simulated device and the application utilizes at least a second behavior extension during execution with respect to the second simulated device.

14. The method of claim 12, further comprising selectively executing the modified application on the first simulated device, the second simulated device, or the first simulated device and the second simulated device.

15. A computer program embedded within a storable computer readable medium, the computer program causing a computer to execute instructions comprising:
at least one instruction for generating a base simulator;
at least one instruction for generating a first simulated device for use with the base simulator;
at least one instruction for loading a first of a plurality of behaviors onto the first simulated device;
at least one instruction for generating a second simulated device within the base simulator, wherein the second simulated device is different from the first simulated device; and
at least one instruction for loading a second of the plurality of behaviors onto the second device.

16. The computer program of claim 15, wherein the first simulated device is a simulation of a first type or configuration of a cellular telephone and the second simulated device is a simulation of a second type or configuration of a cellular telephone.

17. The computer program of claim 15, wherein the plurality of behaviors includes at least one of a digital video camera behavior, a digital still camera behavior, an audio player behavior, a video player behavior, an image viewer behavior, and an electronic organizer behavior.

18. The computer program of claim 16, wherein the second simulated device is a simulation of a cellular telephone, a portable digital assistant, or a pager.

19. The computer program of claim 17, further comprising at least one instruction for receiving a data file.

20. The computer program of claim 19, further comprising at least one instruction for loading the data file onto the first device, the second device, or the first device and the second device.

21. The computer program of claim 19, wherein the first data file and the set data file is an audio file, a video file, a still image file, or a font file.

22. The computer program of claim 21, wherein the audio file is an MPEG audio layer three (MP3) file, a waveform audio format (WAV) file, a Window Media Audio (WMA) file, an OGG file, a Monkey's Audio digital file (APE) file, a VOX file, a Real Audio (RA) file, a synthetic music mobile application format (MMF) file, or musical instrument digital interface (MID) file, a phrase format (SPF) file, or a Qualcomm PureVoice audio file (QCP).

23. The computer program of claim 21, wherein video file is a moving picture experts group (MPEG) file, an audio video interleave (AVI) file, a Windows media video (WMV) file, an advanced streaming format (ASF) file, a Quicktime (MOV) file, or a Real Media (RM) file.

24. The computer program of claim 21, wherein the image file is a joint photographic experts group (JPEG) file, a graphics interchange format (GIF) file, a tagged image file format (TIFF) file, a Adobe Photoshop (PSD) file, a portable networks graphics (PNG) file, or a windows metafile (WMF) file.

25. The computer program of claim 15, further comprising at least one instruction for executing at least one application program at the first simulated device, the second simulated device, or the first simulated device and the second simulated device.

26. The computer program of claim 25, further comprising at least one instruction for detecting one or more errors associated with the execution of the at least one application program.

27. The computer program of claim 26, further comprising at least one instruction for executing a modified application.

28. A device simulator comprising:
a base simulator storable on a computer readable medium, the base simulator causing a computer to execute instructions to simulate a baseline set of behaviors of a physical portable computing device, wherein the physical portable computing device is a first type of a cellular telephone, a portable digital assistant, or a pager; and
a plurality of behavior extensions accessible to the base simulator, the behavior extensions applicable to the base simulator to simulate additional behaviors, other than the baseline set of behaviors, of the physical portable computing device, wherein the physical portable computing device is a second type of a cellular telephone, a portable digital assistant, or a pager.

29. The device simulator of claim 28, wherein the plurality of behavior extensions correspond to an additional component within the physical portable computing device.

30. The device simulator of claim 29, wherein the additional component provides audio player functionality.

31. The device simulator of claim 29, wherein the additional component provides video player functionality.

32. The device simulator of claim 29, wherein the additional component provides image viewer functionality.

33. The device simulator of claim 29, wherein the additional component provides digital video camera functionality.

34. The device simulator of claim 29, wherein the additional component provides digital still camera functionality.

35. The device simulator of claim 29, wherein the additional component provides electronic organizer functionality.

36. A software development system, comprising:
a processor;
a memory device accessible to the processor;
a device simulator embedded within the memory device, the device simulator comprising:
at least one instruction for simulating a first portable computing device;
at least one instruction for simulating a second portable computing device; and
at least one instruction for applying at least one behavior extension to the first portable computing device, the second portable computing device, or to the first portable computing device and to the second portable computing device.

37. The system of claim 36, wherein the device simulator further comprises:
at least one instruction for executing a first device pack to simulate device specific attributes of the first portable computing device.

38. The system of claim 37, wherein the device simulator further comprises:
at least one instruction for executing a second device pack to simulate device specific attributes of the second portable computing device.

39. The system of claim 38, wherein the device simulator further comprises at least one instruction for selectively executing an application.

40. The system of claim 39, wherein the device simulator further comprises at least one instruction for detecting one or more problems with the execution of the first application.

41. The system of claim 40, wherein the device simulator further comprises at least one instruction for selectively executing a modified version of the application, the modified version of the application including instructions to address the detected errors.

42. The system of claim 41, wherein the device simulator further comprises at least one instruction for detecting on or more errors with the execution of the modified application.

43. A portable computing device, comprising:
a processor;
a memory accessible to the processor; and
an application loaded into the memory, wherein the application is a tested application, wherein the tested application is executed on a device simulator having a set of device behaviors common to a plurality of different types of physical computing devices and having a plurality of extension files that define extension features for use by the device simulator to simulate a plurality of additional behaviors for at least one of the plurality of different types of physical computing devices,
wherein the device simulator resides on a computer,
wherein the computer is a desktop computer, a laptop computer, or a handheld computer, and
wherein the application is uploaded to a server from the computer prior to being loaded into the memory.

44. The portable computing device of claim 43, wherein the physical computing device is a cellular telephone, a portable digital assistant, or a pager.

45. The portable computing device of claim 43, wherein the application is downloaded from the server to the portable computing device.

46. The portable computing device of claim 45, wherein the application is downloaded via an over the air connection to the portable computing device.

47. A method for testing an application, the method comprising:
receiving an application;
testing the application at a device simulator to generate a debugged application, wherein the device simulator includes a core simulation program to simulate a baseline set of behaviors of at least one physical portable computing device and extension files defining extension features to be applied to the simulation program to simulate additional behaviors of the at least one physical portable computing device; and
communicating the debugged application to an application server.

48. The method of claim 47, further comprising communicating the debugged application from the application server to a physical device.

49. The method of claim 48, wherein the debugged application is communicated to the physical device via an over the air connection.

50. The method of claim 49, further comprising executing the debugged application on the physical device.

51. A system comprising:
a processor;
a computer memory accessible to the processor;
a simulation program stored within the computer memory and executable by the processor, the simulation program comprising:
a core simulation program to simulate a set of behaviors common to a plurality of different types of physical portable computing devices that may be simulated;
extension files defining extension features for use by the simulation program to simulate device behaviors in addition to the set of behaviors, the device behaviors corresponding to additional features of a physical device selected from the plurality of different types of physical portable computing devices; and
an application program targeted for execution on at least one of the plurality of different types of physical portable computing devices, the application program tested using the simulation program, wherein the application program is tested in connection with use of the simulation program and wherein based on a result of such testing, the application program is modified to produce a modified version of the application program.

52. The system of claim 51, wherein the modified version of the application program is loaded onto a first physical portable computing device selected from the plurality of different types of physical portable computing devices and the modified version of the application program is loaded onto a second physical portable computing device selected from the plurality of different types of physical portable computing devices.

53. The system of claim 52, wherein the modified version of the application program is communicated using an over the air interface to the first physical portable computing device and to the second physical portable computing device.

54. The system of claim 53, wherein the first physical portable computing device executes the modified version of the application program.

55. The system of claim 54, wherein the first physical portable computing device is a cellular telephone and the application program is a game accessible via the cellular telephone.

56. The system of claim 54, wherein the first physical portable computing device is a cellular telephone and the application program is a ring tone manager accessible via the cellular telephone.

57. The system of claim 46, wherein the modified version of the application program is stored in a repository external to the system.

58. The system of claim 57, wherein the repository is a storage module within a server.

59. The system of claim 47, wherein the modified version of the application program utilizes an application program interface (API) corresponding to the first physical portable computing device.

60. The system of claim 59, wherein the API is a Binary Runtime Environment for Wireless (BREW) API.

61. A system comprising:
  a processor;
  a computer memory accessible by the processor;
  a simulation program stored within the computer memory and executable by the processor, the simulation program comprising:
  means for simulating a baseline set of behaviors of at least one physical portable computing device;
  means for defining extension features to be executed in the simulation program to simulate additional behaviors of the at least one physical portable computing device;
  means for testing an application; and
  means for testing a modified application.

62. The system of claim 61, wherein the processor further comprises means for uploading the modified application to a server.

63. A device simulator, comprising:
  a BREW core storable on a computer readable medium, the BREW core causing a computer to execute instructions for providing a base simulator;
  a shared extensions module coupled to the BREW core;
  at least one built-in extension implicit to the shared extensions module, wherein the at least one built-in extension is accessible to the BREW core and provides a first behavior for a physical device simulated by the base simulator;
  at least one generic extension explicit to the shared extensions module, wherein the at least one generic extension is accessible to the BREW core and provides a second behavior for the physical device simulated by the base simulator; and
  at least one device pack that is accessible to the BREW core, wherein the at least one device pack includes at least one device pack extension that is accessible to the BREW core and provides a third behavior for the physical device simulated by the base simulator.

64. The device simulator of claim 63, wherein the at least one device pack includes information selected from the group including primary keypad information, secondary keypad information, keyboard information, primary display information, secondary display information, audio information, font information, supported media formats, application support, Bluetooth information, joystick information, touch screen information, global positioning system information, network information, predictive text entry information, memory information, subscriber information module information, ring tone information, call history information, address book information, and screen saver information.

65. The device simulator of claim 63, wherein the at least one built-in extension is loaded onto the BREW core first.

66. The device simulator of claim 65, wherein the at least one generic extension is loaded onto the BREW core second.

67. The device simulator of claim 66, wherein the at least one device pack extension is loaded onto the BREW core third.

68. The device simulator of claim 66, wherein the at least one generic extension overrides the at least one built-in extension when the generic extension includes a function for a BREW interface that is also provided by the at least one built-in extension.

69. The device simulator of claim 67, wherein the at least one device pack extension overrides the at least generic extension when the device pack extension includes a function for a BREW interface that is also provided by the at least one generic extension.

70. The device simulator of claim 67, wherein the at least one device pack extension overrides the at least one built-in extension when the device pack extension includes a function for a BREW interface that is also provided by the at least one built-in extension.

* * * * *